US012599960B2

(12) United States Patent
Hsieh et al.

(10) Patent No.: US 12,599,960 B2
(45) Date of Patent: Apr. 14, 2026

(54) METHOD FOR LEAD CARBON COMPRESSION MOULDING AND APPLICATIONS THEREOF

(71) Applicant: National Formosa University, Yunlin County (TW)

(72) Inventors: Shu-Huei Hsieh, Yunlin County (TW); Huai-Jen Wu, Yunlin County (TW); Zhi-Xuan Yan, Yunlin County (TW); Zi-Rui Su, Yunlin County (TW); Shi-Ming Wang, Yunlin County (TW); Bo-Cheng Pan, Yunlin County (TW); Cun-Hao Xiao, Yunlin County (TW); Hong-Ci Chen, Yunlin County (TW); Chu-Ting Hsieh, Yunlin County (TW)

(73) Assignee: NATIONAL FORMOSA UNIVERSITY, Yunlin County (TW)

( * ) Notice: Subject to any disclaimer, the term of this patent is extended or adjusted under 35 U.S.C. 154(b) by 632 days.

(21) Appl. No.: 17/986,112

(22) Filed: Nov. 14, 2022

(65) Prior Publication Data

US 2023/0150018 A1      May 18, 2023

Related U.S. Application Data

(60) Provisional application No. 63/281,054, filed on Nov. 18, 2021.

(51) Int. Cl.
*H01M 10/12*        (2006.01)
*B22D 19/04*        (2006.01)
(Continued)

(52) U.S. Cl.
CPC ............. *B22D 25/04* (2013.01); *B22D 19/04* (2013.01); *H01M 4/0435* (2013.01);
(Continued)

(58) Field of Classification Search
CPC .... H01M 4/0435; H01M 4/04; H01M 4/0471; H01M 10/04; B24D 25/04; B24D 19/04
See application file for complete search history.

(56) References Cited

U.S. PATENT DOCUMENTS

| 589,842 A | * | 9/1897 | Leitner | ................... | H01M 4/22 |
| | | | | | 205/63 |
| 2012/0244429 A1 | * | 9/2012 | Lam | ....................... | H01G 11/26 |
| | | | | | 977/773 |

FOREIGN PATENT DOCUMENTS

| CN | 109286004 A | * | 1/2019 | ............ H01M 4/628 |

OTHER PUBLICATIONS

Machine Translation of: Li et al. (CN 109286004 A), Jan. 29, 2019.*

* cited by examiner

*Primary Examiner* — Kenneth J Douyette
(74) *Attorney, Agent, or Firm* — Troutman Pepper Locke LLP; Tim Tingkang Xia, Esq.

(57) ABSTRACT

The present invention discloses a method for lead carbon compression moulding comprising a first stacking step and a first compressing step so that a lead-carbon electrode is obtained through compressing a lead-carbon sandwich stacked of a lead material and a carbon material. Pressurization of the working environment or heating both the lead material and the carbon material is not required during the procedure. A massive production of lead-carbon electrode at room temperature can be anticipated. The lead-carbon electrode produced thereby enhance tolerance of the battery against instable electric current or voltage, and performance remains steady after multiple times of charge-discharge cycles. The lead-carbon electrode produced thereby demonstrates high potentials for application with low cost, low loss and high capacity.

9 Claims, 14 Drawing Sheets

(51) Int. Cl.

| | |
|---|---|
| *B22D 25/04* | (2006.01) |
| *H01M 4/04* | (2006.01) |
| *H01M 4/16* | (2006.01) |
| *H01M 4/36* | (2006.01) |
| *H01M 4/56* | (2006.01) |
| *H01M 4/62* | (2006.01) |
| *H01M 10/06* | (2006.01) |

(52) U.S. Cl.

CPC ........... *H01M 4/0471* (2013.01); *H01M 4/16* (2013.01); *H01M 4/366* (2013.01); *H01M 4/56* (2013.01); *H01M 4/625* (2013.01); *H01M 10/06* (2013.01); *H01M 10/12* (2013.01)

(100)

(1)

Figure 2A:
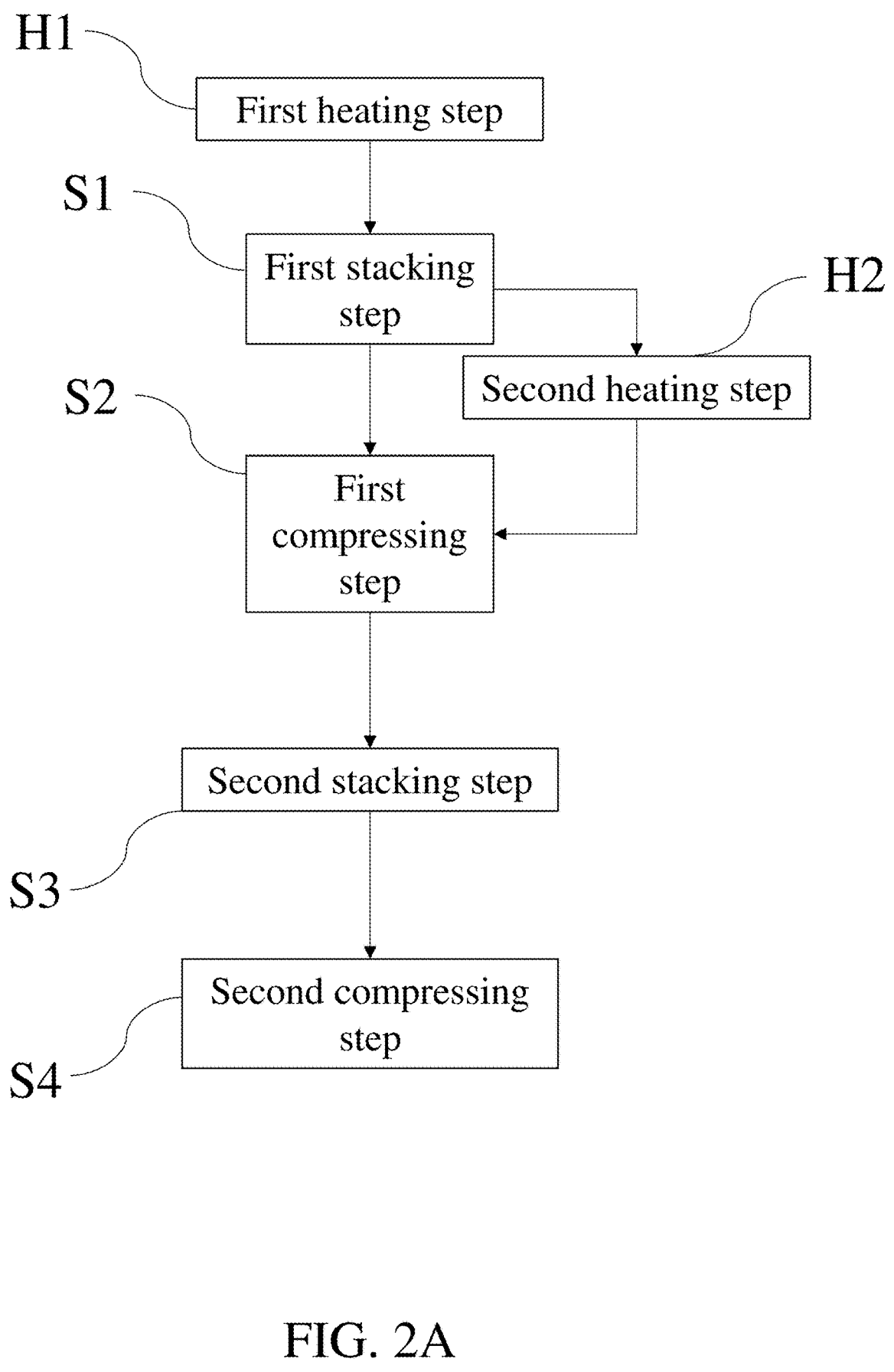

H1

First heating step

S1

First stacking step

H2

Second heating step

S2

First compressing step

Second stacking step

S3

Second compressing step

— lead

— carbon

— lead

— carbon

— lead (C)

(1)/(2)

(Ba)

Cycle Times

Cycle Times

METHOD FOR LEAD CARBON COMPRESSION MOULDING AND APPLICATIONS THEREOF

FIELD OF THE INVENTION

The invention is related to a method for fabricating electrode, in particular, to a method for fabricating electrode made of both lead material and carbon material, also the fabricated electrode is further related to practical applications including lead-carbon electrode set and lead-carbon battery.

BACKGROUND OF THE INVENTION

Nowadays, the price of fossil fuels is highly increased, the supply of fossil fuels is in continuous shortage, and the cost of using various kinds of energy is increased dramatically. In consideration of energy prices and environmental issues, the renewable energy has become the core development project among major countries. Wind power, tidal power, solar power or other renewable energy are the fields of high speed development among many existing technologies.

However, while the renewable energy being rapidly developed, the storage and distribution of energy become the key determinant factor of development in this field. All the aforementioned wind, tidal, and solar energy are renewable energy that rely on nature, and then they are influenced by climate or immediate environmental factors. For example, the well-known solar power generation uses solar panels to convert light energy into electricity, which is then stored in storage cells. Anyway, the storage cells used in the general solar power system are easily affected by the voltage instability caused by different strengths and weaknesses of the sunlight, Hence, required time for the storage cells to reach saturation is unavoidably unstable and charging by the solar panels is unstable. Clearly, the repeated unsaturated charging and discharging easily damage the batteries and then shorten their service life.

Except the aforementioned renewable energy storage grid demand, industrial applications have the same demand for the ability to withstand unstable voltage and unsaturated charging and discharging state of the battery. For example, a common technical approach for the battery used by hybrid vehicles is using power conversion during the drive to generate electricity. Anyway, like the situation of unstable power generation of renewable energy caused by weather factors, the power supply of the hybrid vehicles during the drive also is unstable owing to the impact of road conditions, and then the battery unavoidably faces voltage instability of the depletion pressure.

On the other hand, vehicle start-stop batteries face similar problems. For example, in common "12-voltage start-stop system", voltage fluctuations caused by continuous engine starts produce considerable wear and tear on the start-stop battery. As a result, 12-voltage start-stop systems are susceptible to continuous voltage fluctuations caused by voltage drops. As a result, the battery life is impacted and frequent battery replacements are required, which leads to increased consumable costs in electric vehicles. Accordingly, in response to the aforementioned problems, there is an urgent requirement to develop new batteries or electrical energy storage devices that can withstand unstable voltages and large numbers of recycling.

SUMMARY OF THE INVENTION

To address the above issue, the present invention provides a method for lead carbon compression moulding. The provided method comprises a first stacking step and a first compressing step. The first stacking step comprises the following: placing a first carbon material between a first lead material and a second lead material so as to form a first lead-carbon sandwich, and the first compressing step comprises the following: compressing the first lead-carbon sandwich between a first compressing unit and a second compressing unit such that the first lead material and the second lead material are combined with the first carbon material so as to form a first lead-carbon electrode. The first lead-carbon sandwich has a first thickness $d1$ and the first lead-carbon electrode has a second thickness $d2$, wherein the ratio of $d1$ to $d2$ is less than 10:1.

Optionally, in the method as previously described, one surface of the first lead material is in contact with the first carbon material to form a first joint surface and another surface is a first compressed surface directly contacted with the first compressing unit. Also, one surface of the second lead material is in contact with the first carbon material opposite to the first lead material to form a second joint surface and another surface is a second compressed surface directly contacted with the second compressing unit. Moreover, the distance between the first compressed surface of the first lead-carbon sandwich and the second compressed surface is the first thickness $d1$ and the distance between the first compressed surface of the first lead-carbon electrode and the second compressed surface is the second thickness $d2$.

Optionally, in the method as previously described, the lead to carbon ratio of the first joint surface is between 1:0.01 to 1:1, and the lead to carbon ratio of the second joint surface is between 1:0.01 to 1:1.

Optionally, in the method as previously described, the first compressing unit and the second compressing unit forms a working distance therebetween, wherein the ratio of the first thickness $d1$ to the working distance is between 1:1 to 35:1.

Optionally, in the method as previously described, the first carbon material is a carbon fiber fabric, which is made of materials selected from the group consisting of activated carbon, bamboo carbon, charcoal or any combination thereof.

Optionally, in the method as previously described, a first heating step is further comprised, which heats the first lead material, the second lead material and the first carbon material to a first temperature before the first stacking step, wherein the first temperature is between room temperature and lead melting point.

Optionally, in the method as previously described, the first compressing unit is a first roller and the second compressing unit is a second roller. Wherein, the first roller and the second roller roll relative to each other along their respective axes at a rolling rate so as to compress the first thickness $d1$ into the second thickness $d2$, also the ratio of $d1$ to $d2$ is between 3:1 to 6.5:1.

Optionally, in the method as previously described, a second stacking step and a second compressing step is further comprised. The second stacking step comprises the following: placing a second carbon material between the first lead-carbon switch and a third lead material so as to form a second lead-carbon sandwich. The second compressing step comprises the following: compressing the second lead-carbon sandwich between the first compressing unit and the second compressing unit such that the third lead material and the second carbon material are combined with the first lead-carbon switch so as to form a second lead-carbon electrode. Wherein, the second lead-carbon sandwich has a third thickness d3 and the second lead-carbon electrode has a fourth thickness d4, and the ratio of d3 to d4 is less than 10:1.

Moreover, the present invention also provides a lead-carbon electrode set comprising at least one lead-carbon electrode made by the method as previously described.

Further, the present invention also provides a lead-carbon battery comprising an electrolyte, an anode sheet set and a cathode sheet set. Wherein the anode sheet set is immersed in the electrolyte and electrically connected to an anode, and comprises the lead-carbon electrode set as previously described. Wherein, the cathode sheet set is immersed in the electrolyte and electrically connected to a cathode, and comprises the lead-carbon electrode set as previously described.

The method provided by the present invention is environmentally friendly, easy to fabricate, and free of heat treatment process. The method also allows the temperature of compressed lead-carbon molding to be adjusted according to the user's demands. In addition, the fabricating environment does not require additional pressurized air, which saves energy, reduces carbon emissions, and reduces hazards to the operator. In addition, the lead material and carbon materials do not require pretreatment, which reduces the emission of organic solvents and reduces environmental pressure. The lead-carbon electrode provided by the present invention can be used as a super capacitor, which is adapt to current and voltage fluctuations easily encountered in fast charge/discharge cycles and can withstand multiple cycles. It has stable Coulomb efficiency, stable depth-of-discharge performance, and low battery breakage rate. Therefore, it can be applied to storage devices used to store recycle energy and also to improve the rapid wear and tear of batteries in the automotive industry.

BRIEF DESCRIPTION OF THE DRAWINGS

FIG. 2A is a flow chart illustrating alternative implementation of the method for lead carbon compression moulding.

DETAILED DESCRIPTION OF THE INVENTION

Figure 1A:
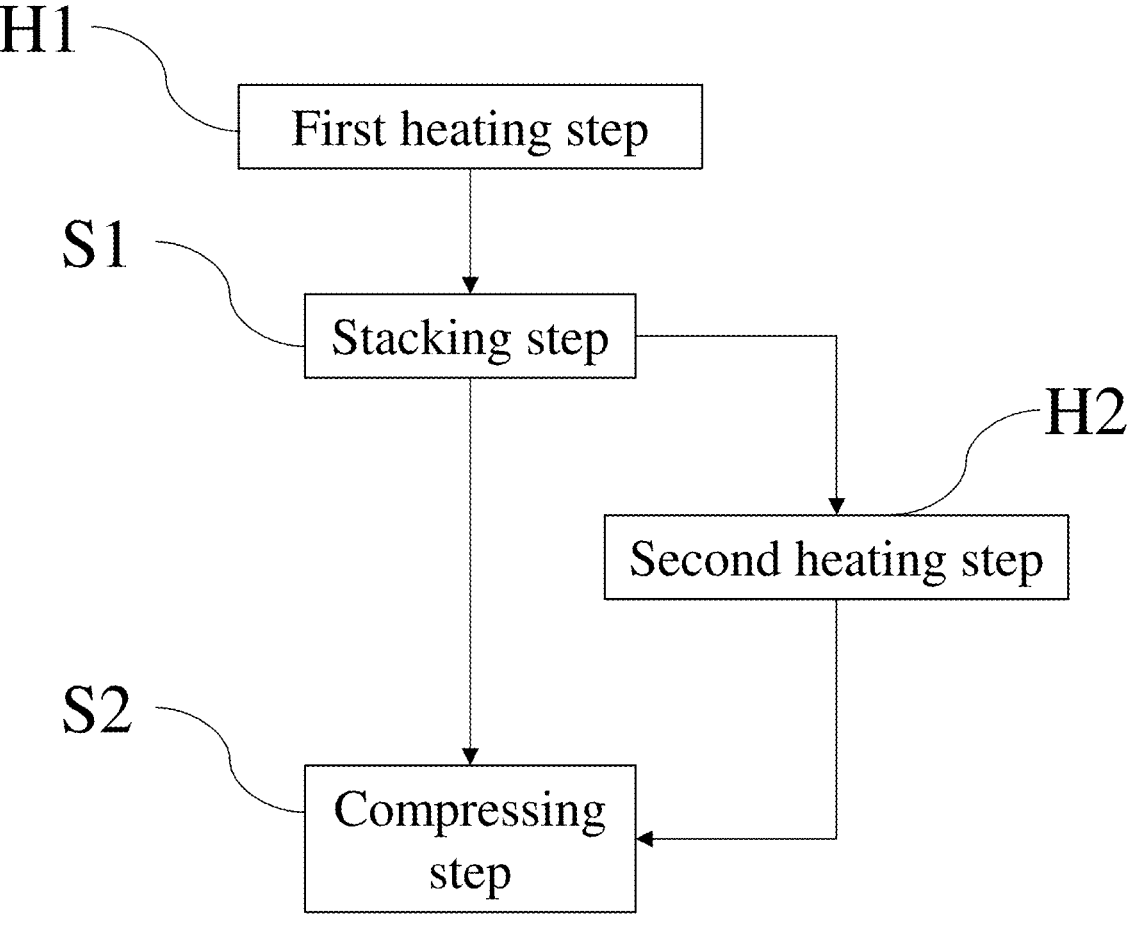
FIG. 1A is a flow chart illustrating a method for lead carbon compression moulding.
Figure 1B:
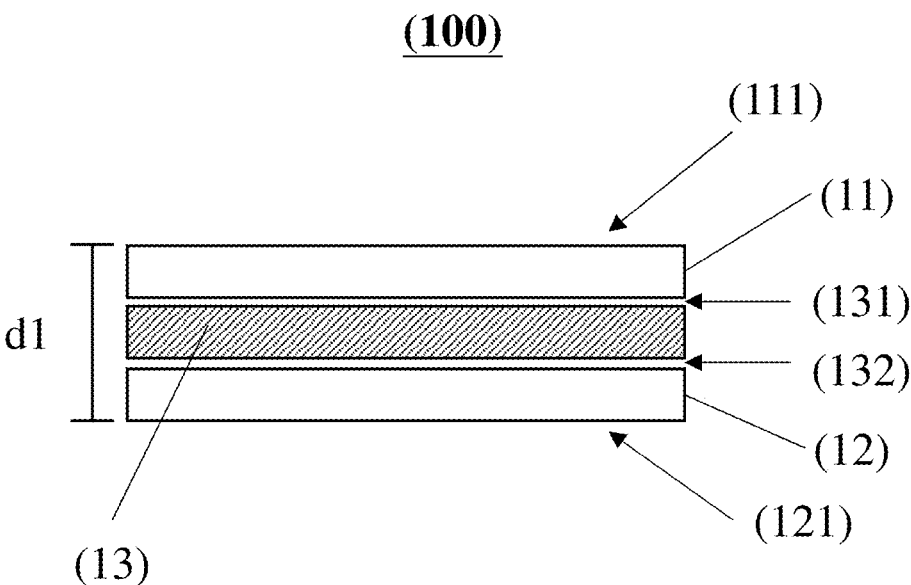
FIG. 1B is a structural schematic diagram illustrating the first lead-carbon sandwich.
Figure 1C:
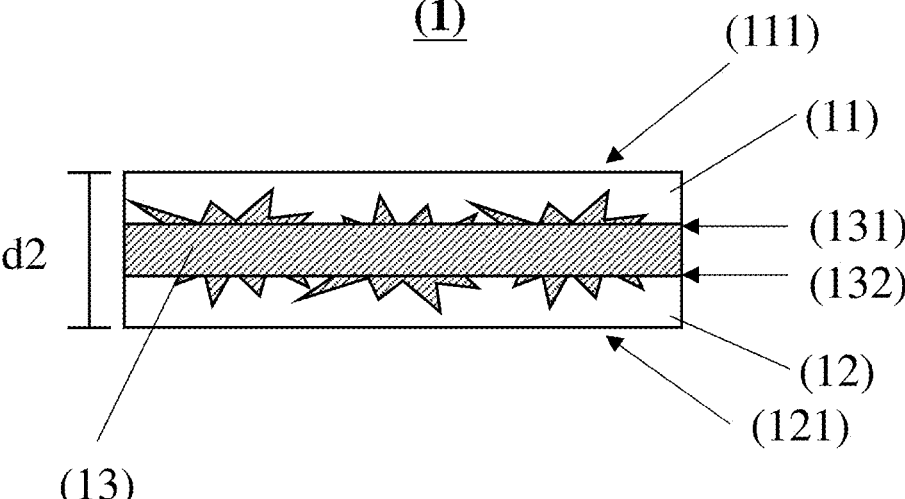
FIG. 1C is a structural schematic diagram illustrating the first lead-carbon electrode.

The following embodiments are used to illustrate the technical content of the present invention, but they do not limit the manner of implementation of the invention. All the methods, materials, structures and other aspects that are not outside the spirit of the invention are within the scope of protection of the invention.

One implementation of the invention provides a method for lead carbon compression moulding, which comprises a first stacking step (S1) and a first compressing step (S2). By referring to FIG. 1A to FIG. 1D, the first stacking step (S1) comprises the following: placing a first carbon material (13) between a first lead material (11) and a second lead material (12) so as to form a first lead-carbon sandwich (100), and the first compressing step (S2) comprises the following: compressing the first lead-carbon sandwich (100) between a first compressing unit (31) and a second compressing unit (32) such that the first lead material (11) and the second lead material (12) are combined with the first carbon material (13) so as to form a first lead-carbon electrode (1).

In this embodiment, after being quantified, the ratio of lead to carbon in the joint surface between lead material and carbon material and the distance between the compressed surfaces between the compressing units are acquired. These aforementioned parameters have a profound effect on the function of the first lead-to-carbon electrode (1) in terms of capacitance, conductivity and battery life in battery applications. In details, one surface of the first lead material (11) is in contact with the first carbon material (13) to form a first joint surface (131), and another surface is a first compressed surface (111) in physical contact with the first compressing unit (31). Also, one surface of the second lead material (12) opposite to the first lead material (11) is in contact with the first carbon material (13) to form a second joint surface (132), and another surface is a second compressed surface in physical contact with the second compressing unit (32). For the first joint surface 131 and the second joint surface 132, the lead to carbon ratio is between 1:0.01 to 1:1.0, preferably between 1:0.03 to 1:0.5.

In details, the lead to carbon ratio is the lead to carbon atomic number ratio, which is obtained by calculating the number of lead atoms contained in the lead material and the number of carbon atoms contained in the carbon material, respectively. As shown in Table 1A, the number of lead atoms contained in the lead material and the number of carbon atoms contained in the carbon material and their ratios for various embodiments of fabrications 1 to 8 are listed, wherein the lead to carbon atomic number ratio is between 1:0.07 to 1:0.3.

TABLE 1A

| | lead material | | Carbon material | | |
|---|---|---|---|---|---|
| | atomic number (mole) | number (sheet) | atomic number (mole) | number (sheet) | lead to carbon atomic number ratio |
| 1 | 0.57 | 2 | 0.04 | 2 | 1:0.07 |
| 2 | 0.57 | 4 | 0.04 | 2 | 1:0.07 |
| 3 | 0.57 | 4 | 0.04 | 2 | 1:0.07 |

5

TABLE 1A-continued

| | lead material | | Carbon material | | |
|---|---|---|---|---|---|
| | atomic number (mole) | number (sheet) | atomic number (mole) | number (sheet) | lead to carbon atomic number ratio |
| 4 | 0.62 | 4 | 0.05 | 2 | 1:0.08 |
| 5 | 0.62 | 3 | 0.05 | 2 | 1:0.08 |
| 6 | 0.62 | 3 | 0.24 | 2 | 1:0.39 |
| 7 | 0.86 | 3 | 0.07 | 2 | 1:0.08 |
| 8 | 0.57 | 2 | 0.18 | 9 | 1:0.32 |

6

In this implementation, some embodiments illustrate that the joint surface among the first lead material (11), the second lead material (13) and the first carbon material (12) is also influenced by their ratio of lead to carbon volumes. In details, the ratio of the total volume (VPb) of the first lead material (11) and the second lead material (13) to the total volume (VC) of the first carbon material (12) is between 1:0.01 to 1:1.0, preferably between 1:0.03 to 1:0.8. As shown in Table 1B, the volume of lead and the volume of carbon and their ratios are listed for embodiments of fabrications 1 to 8. In these embodiments, the ratio of lead to carbon material VPb:VC is between 1:0.05 to 1:0.56.

TABLE 1B

| | first lead material | | second lead material | | first carbon material | | | | |
|---|---|---|---|---|---|---|---|---|---|
| | volume ($cm^3$) | number (sheet) | volume ($cm^3$) | number (sheet) | volume ($cm^3$) | Number (sheet) | $V_{Pb}$ ($cm^3$) | $V_C$ ($cm^3$) | $V_{Pb}$:$V_C$ |
| 1 | 10.4 | 1 | 10.4 | 1 | 1.260 | 2 | 20.8 | 2.52 | 1:0.12 |
| 2 | 10.4 | 2 | 10.4 | 2 | 1.260 | 2 | 41.6 | 2.52 | 1:0.06 |
| 3 | 10.4 | 2 | 10.4 | 2 | 1.260 | 2 | 41.6 | 2.52 | 1:0.06 |
| 4 | 11.7 | 2 | 11.7 | 2 | 1.225 | 2 | 46.8 | 2.45 | 1:0.05 |
| 5 | 11.7 | 2 | 11.7 | 1 | 1.225 | 2 | 35.1 | 2.45 | 1:0.07 |
| 6 | 11.7 | 2 | 11.7 | 1 | 1.568 | 2 | 35.1 | 3.136 | 1:0.09 |
| 7 | 11.7 | 2 | 11.7 | 1 | 2.200 | 2 | 35.1 | 4.4 | 1:0.13 |
| 8 | 11.7 | 1 | 11.7 | 1 | 1.470 | 9 | 23.4 | 13.23 | 1:0.56 |

To be embodiments, the first compressing unit (31) and the second compressing unit (32) forms a working distance (w) therebetween, which is smaller or equal to the distance from the first compressed surface (111) to the second compressed surface (112), i.e., is the first thickness d1 of the first lead-carbon sandwich (100). During the second compressing step (S2), the first compressing unit (31) and the second compressing unit (32) apply a vectorial relative compressing pressure, defined by the working distance (w), on the first compressed surface (111) and the second compressed surface (121) respectively. Wherein, the working distance (w) is between 0.1 to 2.0 centimeter, preferably between 0.01 to 0.1 centimeter. The first lead-carbon sandwich is reformed by the compressing force to be the first lead-carbon electrode (1) which has a second thickness d2 being smaller the d1. The preferred ratio of d1 to d2 is smaller than 10:1, preferably between 3:1 to 6.5:1. As shown in Table 1C, some specific data related to various embodiments such as fabrications 1 to 7 are listed, such as the ratio of the quantity of lead to carbon material, the first thickness d1 of the lead to carbon sandwich and the second thickness d2 after compression. In these embodiments, the ratio of the first thickness d1 to the second thickness d2 is between 3.5:1 to 6.39:1.

TABLE 1C

| | first lead material | | second lead material | | first carbon material | | | | |
|---|---|---|---|---|---|---|---|---|---|
| | thickness (cm) | number (sheet) | thickness (cm) | number (sheet) | thickness (cm) | number (sheet) | d1 (cm) | d2 (cm) | d1:d2 |
| 1 | 0.1 | 1 | 0.1 | 1 | 0.030 | 2 | 0.26 | 0.072 | 3.61:1 |
| 2 | 0.1 | 2 | 0.1 | 2 | 0.030 | 2 | 0.46 | 0.072 | 6.39:1 |
| 3 | 0.1 | 2 | 0.1 | 2 | 0.030 | 2 | 0.46 | 0.092 | 5.00:1 |
| 4 | 0.1 | 2 | 0.1 | 2 | 0.025 | 2 | 0.45 | 0.087 | 5.17:1 |
| 5 | 0.1 | 2 | 0.1 | 1 | 0.025 | 2 | 0.35 | 0.085 | 4.12:1 |
| 6 | 0.1 | 2 | 0.1 | 1 | 0.032 | 2 | 0.36 | 0.087 | 4.18:1 |
| 7 | 0.1 | 2 | 0.1 | 1 | 0.025 | 2 | 0.35 | 0.100 | 3.50:1 |

In a particular embodiment, the first compressing unit (31) is a first roller (R1) and the second compressing unit (32) is a second roller (R2), wherein the first roller (R1) and the second roller (R2) roll at a rolling rate relative to each other along their respective axes. In order to stabilize the quality of the fabricated lead-carbon electrode so that the ratio of d1 to d2 can be stable between the aforementioned ratio range, the working distance (w) is set in the range of 0.01 to 2.0 cm, preferably 0.01 to 0.1 cm, and the rolling rate is set from 0.2 to 25 rpm. FIG. 1D illustrates one preferred embodiment of the method in the implementation. In short, the first lead-carbon sandwich (100) moves from one end of the working spacing (w) formed between the first roller (R1) and the second roller (R2) to the other end, and the movement is driven by the opposing motion between the first roller (R1) and the second roller (R2). Wherein, a first pressure point (P1) on the circumference of this first roller (R1) moves along a first axis (Ax1) with a first fixed radius (r1) towards this first lead-carbon sandwich (100). In contrast, a second pressure point (P2) on the circumference of the second roller (R2) moves along a second axis (Ax2) with a second fixed radius (r2) towards the second lead-carbon sandwich (100). Wherein, the ratio of the first fixed radius (r1) to the second fixed radius (r2) is 1:1. Thus, when the first pressure point (P1) and the second pressure point (P2) move to the first pressure surface (111) and the second pressure surface (121) respectively, a compressing pressure is applied to the first lead-carbon sandwich (100) for changing its thickness and completing the combining of the lead material and the carbon material.

In this implementation, better, the ratio of the first thickness d1 to the working distance (w) is between 1:1 to 35:1, preferably 4:1 to 30:1. As shown in Table 2, some embodiments, such as fabrications 8 to 14, are listed to present the ratio of the number of lead material to carbon material, the first thickness (d1) of the lead-carbon sandwich, and the working distance (w) between the compressed lead-carbon sandwiches in this implementation. In these embodiments, the ratio of the first thickness (d1) to the working distance (w) is between 4.7:1 to 29:1.

lead-carbon electrode (1). Specifically, the first lead material (11) and the second lead material (13) are pulled in opposite directions by a peeling force tester to test the force required to peel the first lead material (11) or the second lead material off the first carbon material (12).

Figure 2B:
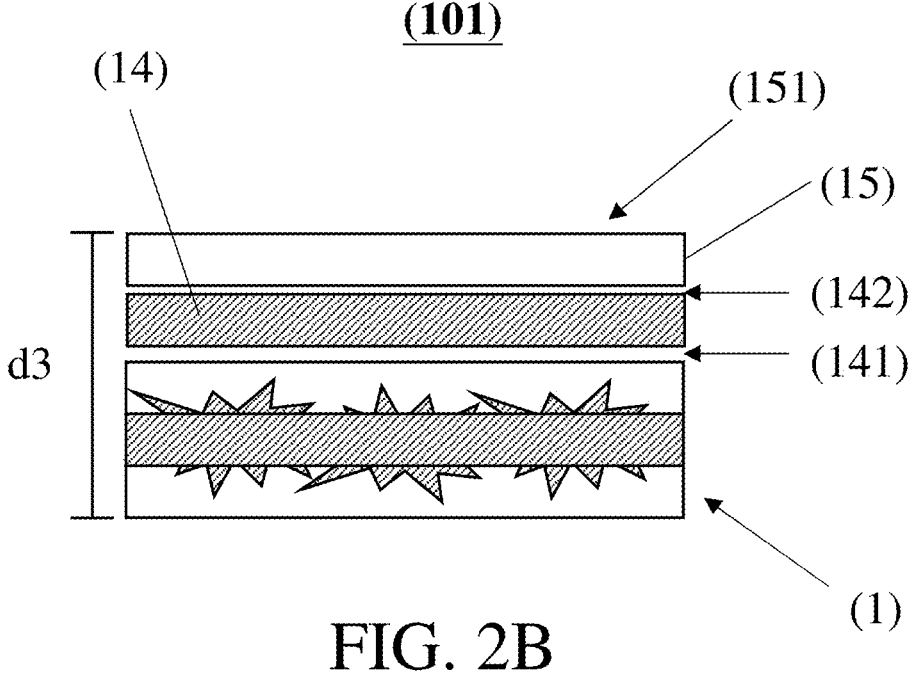
FIG. 2B is a structural schematic diagram illustrating the second lead-carbon sandwich.
Figure 2C:
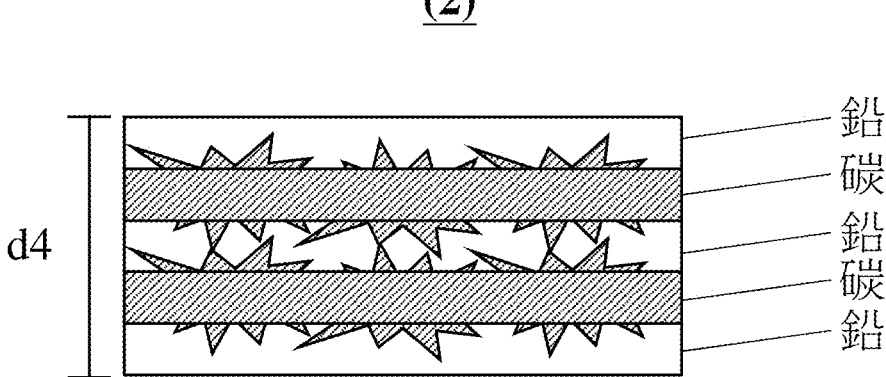
FIG. 2C is a structural schematic diagram illustrating the second lead-carbon electrode.
Figure 2D:
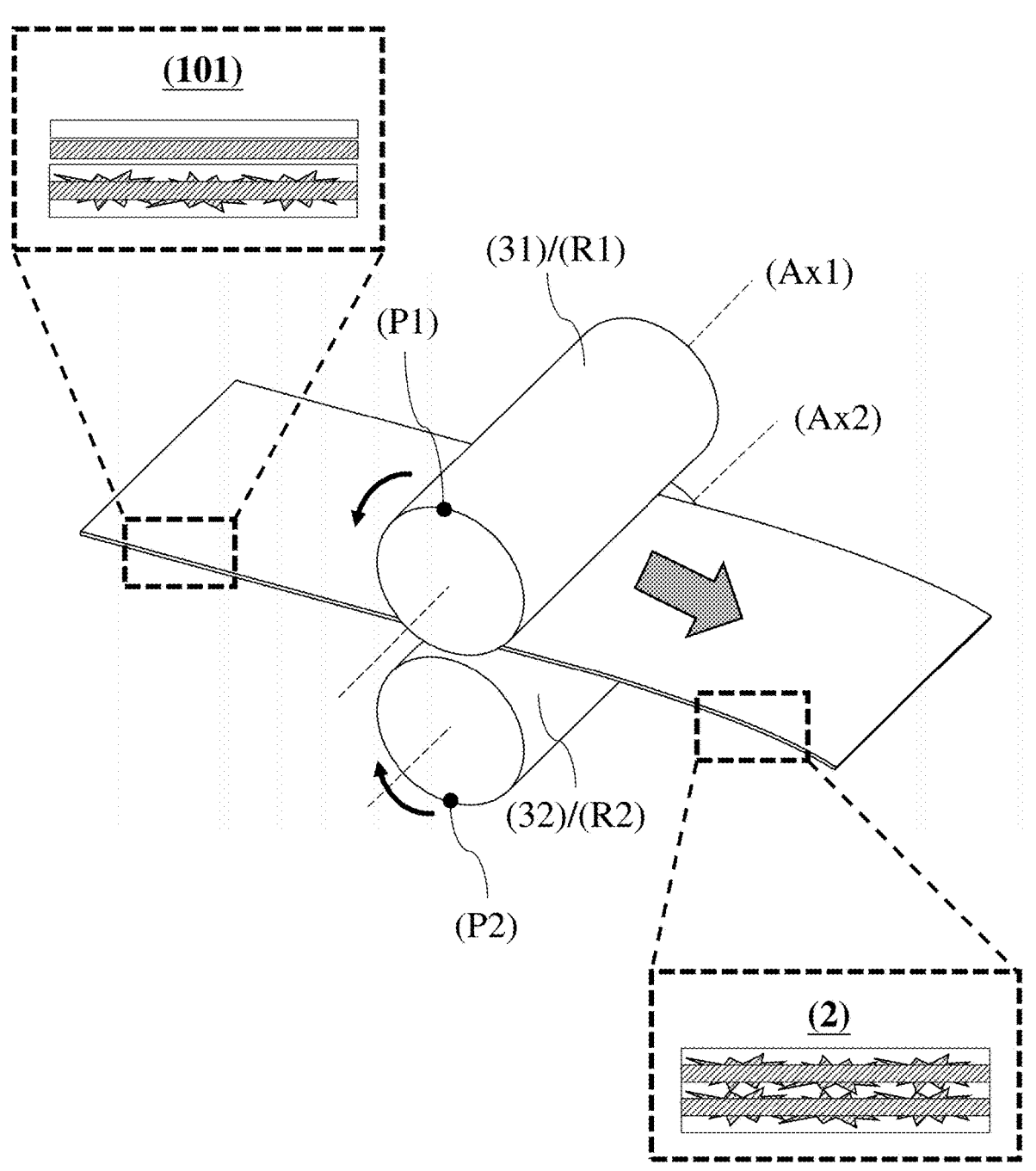
FIG. 2D is another exemplary structure for illustrating the roller compression lead carbon moulding.

In this implementation, in order to substantially increase the electrical capacity of the lead-carbon electrode to meet the demand of the back-end battery, the method further includes a second stacking step (S3) and a second compressing step (S4). As shown in FIG. 2A, the second stacking step (S3) comprises the following: placing a second carbon material (14) between the first lead-carbon sandwich (100) and a third lead material (15) to obtain a second lead-carbon sandwich (101), also the second compressing step (S4) comprises the following: compressing the second lead-carbon sandwich (101) between the first compressing unit (31) and the second compressing unit (32) to make the second lead-carbon electrode (2), wherein the second lead-carbon electrode (2) is obtained by combining the third lead material (15) and the second carbon material (14) with the first lead-carbon sandwich (100). The second lead-carbon electrode (2) has a lead-carbon-lead-carbon-lead structure, which increases the overall thickness of the lead-carbon electrode to increase the electrode thickness in response to the battery capacity demand, but not limited herein. In these embodiments, one side of the second carbon material (14) is in contact with the first lead material (11) or the second lead material (12) to form a third joint surface (141), and a fourth joint surface (142) is in contact with the third lead material (15) opposite to the third joint surface (141). Also, one side of the third lead material (15) opposite to the fourth joint surface (142) is a third compressed surface (151). Wherein, the lead to carbon ratio of the third joint surface (141) and the fourth joint surface (142) is between 1:0.01 to 1:1.0, better 1:0.03 to 1:0.5, and further preferably 1:0.07 to 1:0.3.

The second lead-carbon sandwich (101) has a third thickness d3 and the second lead carbon electrode (2) has a fourth thickness d4. Under the action of the compressing pressure, the d4 is smaller than the d3, and the ratio of d3 to d4 is better less than 10:1, favorably between 5:1 to 9:1. In several

TABLE 2

| | first lead material | | second lead material | | first carbon material | | first thickness | working distance | |
|---|---|---|---|---|---|---|---|---|---|
| | thickness (cm) | number (sheet) | thickness (cm) | number (sheet) | thickness (cm) | number (sheet) | d1 (cm) | (w) (cm) | d1:(w) |
| 8 | 0.1 | 1 | 0.1 | 1 | 0.03 | 9 | 0.47 | 0.1 | 4.70:1 |
| 9 | 0.1 | 1 | 0.1 | 1 | 0.03 | 3 | 0.29 | 0.01 | 29.0:1 |
| 10 | 0.1 | 2 | 0.1 | 1 | 0.03 | 2 | 0.36 | 0.067 | 5.37:1 |
| 11 | 0.1 | 2 | 0.1 | 2 | 0.03 | 2 | 0.46 | 0.06 | 7.67:1 |
| 12 | 0.1 | 1 | 0.1 | 1 | 0.03 | 2 | 0.26 | 0.045 | 5.78:1 |
| 13 | 0.1 | 2 | 0.1 | 1 | 0.05 | 2 | 0.40 | 0.075 | 5.33:1 |
| 14 | 0.1 | 2 | 0.1 | 2 | 0.05 | 3 | 0.55 | 0.075 | 7.33:1 |

In order to further verify that the lead-carbon electrode obtained by the above method has good lead-carbon combining properties, the first lead-carbon electrode (1) is further subjected to a peel strength test, which can withstand a peel force of 15 to 29 kg. Generally, the peel strength test is used to measure the adhesive strength of materials. The well-known peel strength test separates the combined material at an angle of 180 degrees to test the average load per unit width of the combining line. It has been popularly used to measure the adhesive strength of films, biological materials, dental materials, medical packaging, etc., and also can be used to measure the combining properties of the first embodiments, the working distance (w) is set in the range of 0.1 to 2.0 centimeters, preferably 0.01 to 0.1 centimeters, and the rolling rate is set from 0.2 to 25 rpm. Thus, the ratio of d3 to d4 is stabilized between the aforementioned ratio range, and then the quality of the produced lead-carbon electrode is stabilized.

Figure 3A:
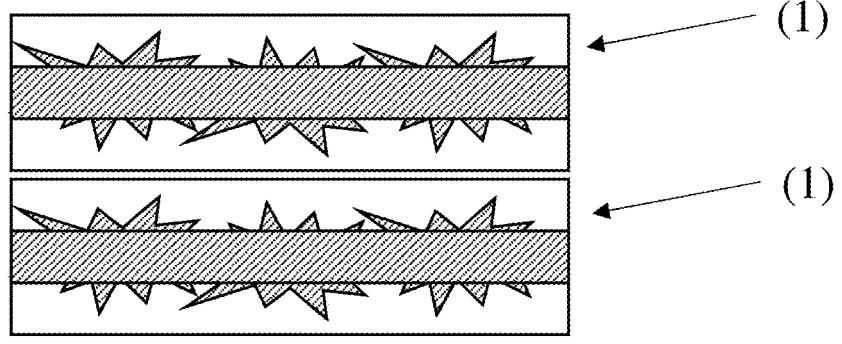
FIG. 3A is a structural schematic diagram illustrating how at least two first lead-carbon electrodes are stacked together.
Figure 3B:
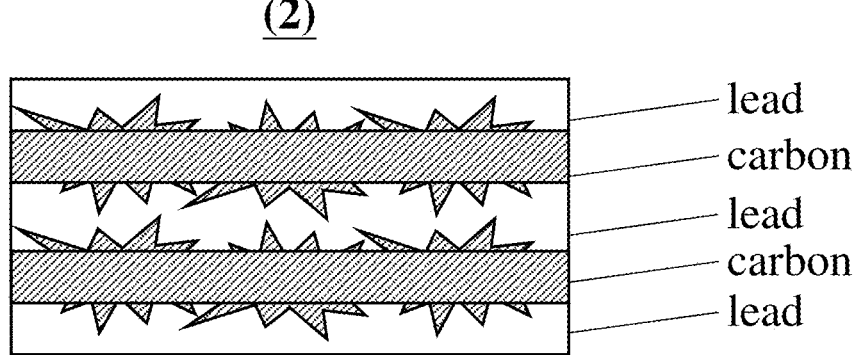
FIG. 3B is a structural schematic diagram illustrating another example of the second lead-carbon electrode.

In some embodiments, the second stacking step (S3) comprises laminating at least two first lead carbon electrodes (1) as previously described. Wherein, these first lead-carbon electrodes (1) are in contact with each other on the lead side to form a laminated structure. As shown in FIG. 3A, the structure of the two first lead-carbon electrodes (1) as described above are shown in detail. As shown in FIG. 3B, the second lead-carbon electrode (2) formed after the second compressing step (S4) has a lead-carbon-lead-carbon-lead structural layer.

Figure 4:
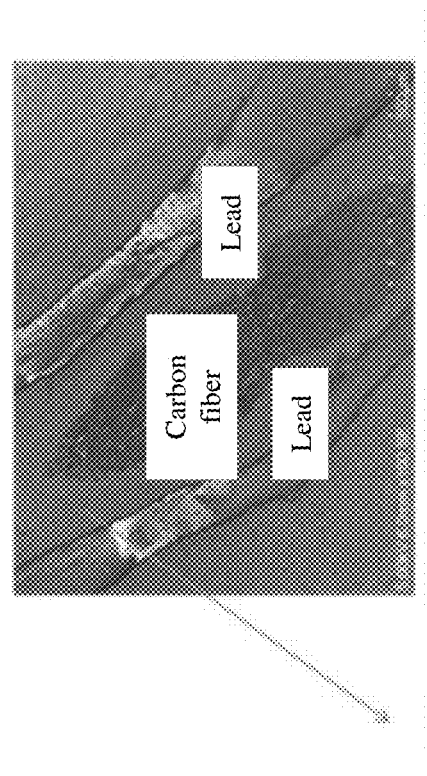
FIG. 4 is a longitudinal sectional electronic micrograph of lead-carbon electrode
Figure 4:
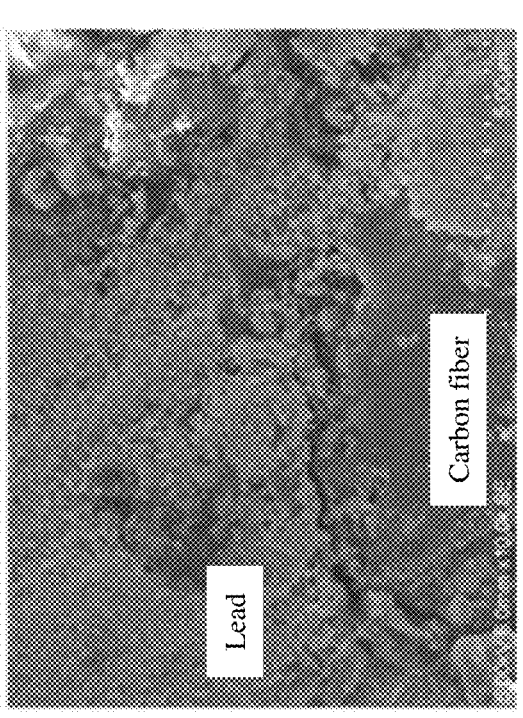
Figure 4:
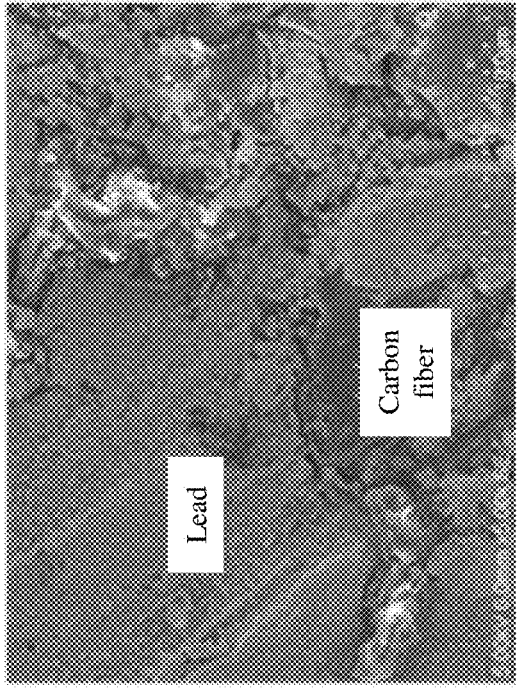

In this implementation, the method can optionally be performed at room temperature or under heated conditions. Note that the heating temperature is not higher than the melting point of lead, 327.5° C., unlike the conventional infiltration method of molting lead into carbon. To combine the carbon material while the semi-rong molten lead material retains the original shape of the lead material, the temperature is raised to 50 to 270° C., better 60 to 170° C., and preferably 110 to 150° C. As shown in FIG. 4, in one embodiments of this embodiment, the longitudinal section of the lead-carbon electrode can present that the carbon fibers can be covered by the lead material with no gap therebetween. More specifically, it is optional to heat all of the lead-carbon sandwich, the first compressing unit and the second compressing unit, or optional to heat both the first compressing unit and the second compressing unit, or optional to only heat the lead-carbon sandwich. Indeed, to achieve the desired effect of the present method, the only requirement is that the lead-carbon sandwich has been brought to the required temperature to change the lead material to a semi-molten state.

Figure 1D:
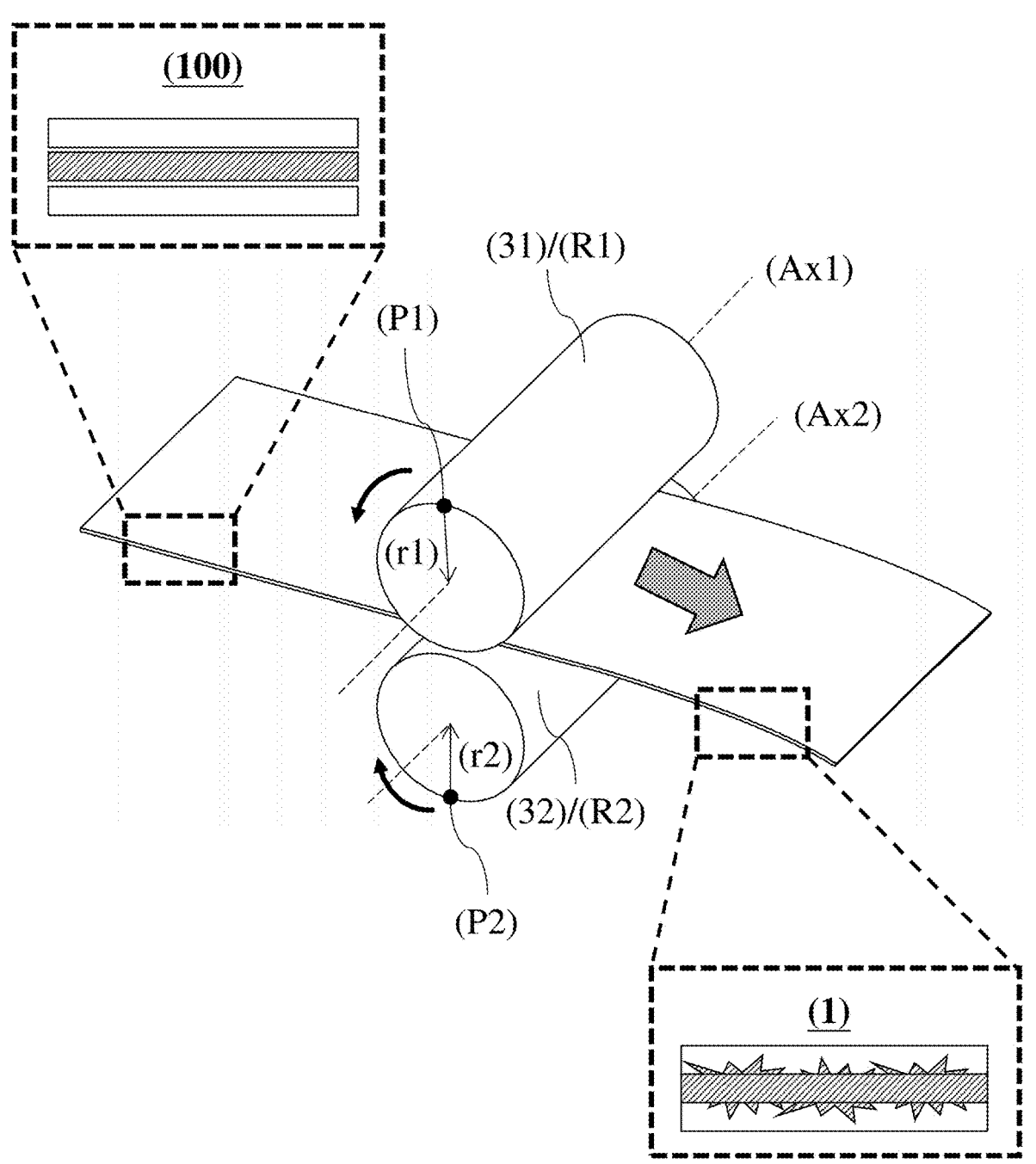
FIG. 1D is an exemplary structure for illustrating the roller compression lead carbon moulding.

To achieve the aforementioned heating purpose, as shown in FIG. 1A and FIG. 2A, the method further comprises a first heating step (H1), a second heating step (H2) or a combination thereof. The first heating step (H1) comprises heating the first lead material (11), the second lead material (12) and the first carbon material (13) to a first temperature before the stacking step (S1). The second heating step (H2) comprises heating the first lead-carbon sandwich (100), and/or both the first compressing unit (31) and the second compressing unit (32) to a second temperature before the compressing step (S2). Wherein the second temperature is equal to or not equal to the first temperature. Specifically, the first temperature is between 60 and 170° C., preferably between 110 and 150° C., and the second temperature is between 60 and 170° C., preferably between 110 and 150° C.

In the present implementation, the carbon material can be a carbon fiber fabric, such as woven carbon cloth or nonwoven carbon cloth. For example, activated carbon, bamboo charcoal or charcoal material. Specifically, the carbon fiber fabric provided by different companies can be used, such as the activated carbon fiber fabric (ECF) provided by Chemviron Carbon in the United Kingdom and the general engineering reinforcement carbon fiber (PCF) provided by Taiwan Plastic Industry Co. Because the method provided by the invention can optionally be carried out at room temperature or under heated conditions, the aforementioned carbon fabrics need not be further treated with other chemical treatments such as chemical oxidation (Cox), heat oxidation in air (Aox) or plasma oxidation treatment (PDX). This invention uses lead and carbon heterogeneous materials and combine lead material and carbon material strongly. Thus, a lead-carbon joint surface with high electrochemical stability is formed. By using low temperature compression, the lead material can penetrate into the gap of carbon fiber woven structure and form a complete covering structure around the carbon fiber, which makes the lead-carbon surface dense. By using the conductive network formed by the interweaving of carbon fibers in the carbon fiber fabric, not only the conductivity and capacity of lead-carbon electrode are improved, but also the electrochemical reaction between the carbon material and electrolyte during the charging and discharging process are prevented. Moreover, the conventional lead-acid batteries induce lead sulfate during the charging and discharging process. The accumulation of lead sulfate decreases both the conductivity of the electrode and the capacity of the electrode. Thus, the Columbic efficiency is lowered and the battery life is reduced. Further, carbon material does not react electrochemically with electrolyte. Thus, it slows down the accumulation of lead sulfate. Besides, because carbon fibers are interwoven inside the electrode sheet to form a conductive network, it maintains the conductivity of the electrode sheet and greatly improves the conductivity of the electrode sheet simultaneously. Furthermore, the low impedance makes the electrode sheet not easy to generate heat and the energy is fully released in the discharge, hence, it can maintain the Columbic efficiency close to 100% after several cycles of charging and discharging.

Figure 5:
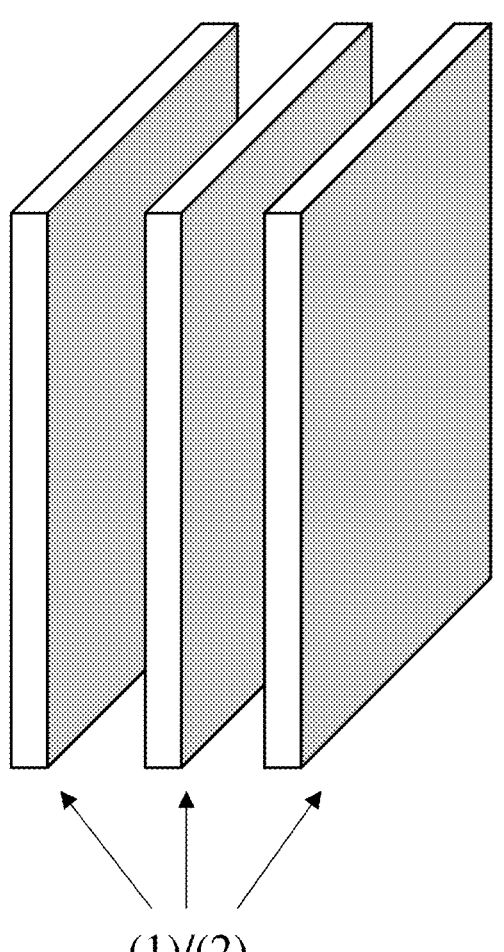
FIG. 5 is a schematic diagram of the side view of the electrode set provided by the invention.

Based on the aforementioned lead-carbon electrode, the present invention can be further applied to realize a lead-carbon electrode set (C). As shown in FIG. 5, some embodiments of the lead-carbon electrode set (C) are illustrated. The lead-carbon electrode set (C) comprises at least a first lead-carbon electrode (1), a second lead-carbon electrode (2) or a combination thereof made by the method described previously.

Figure 6:
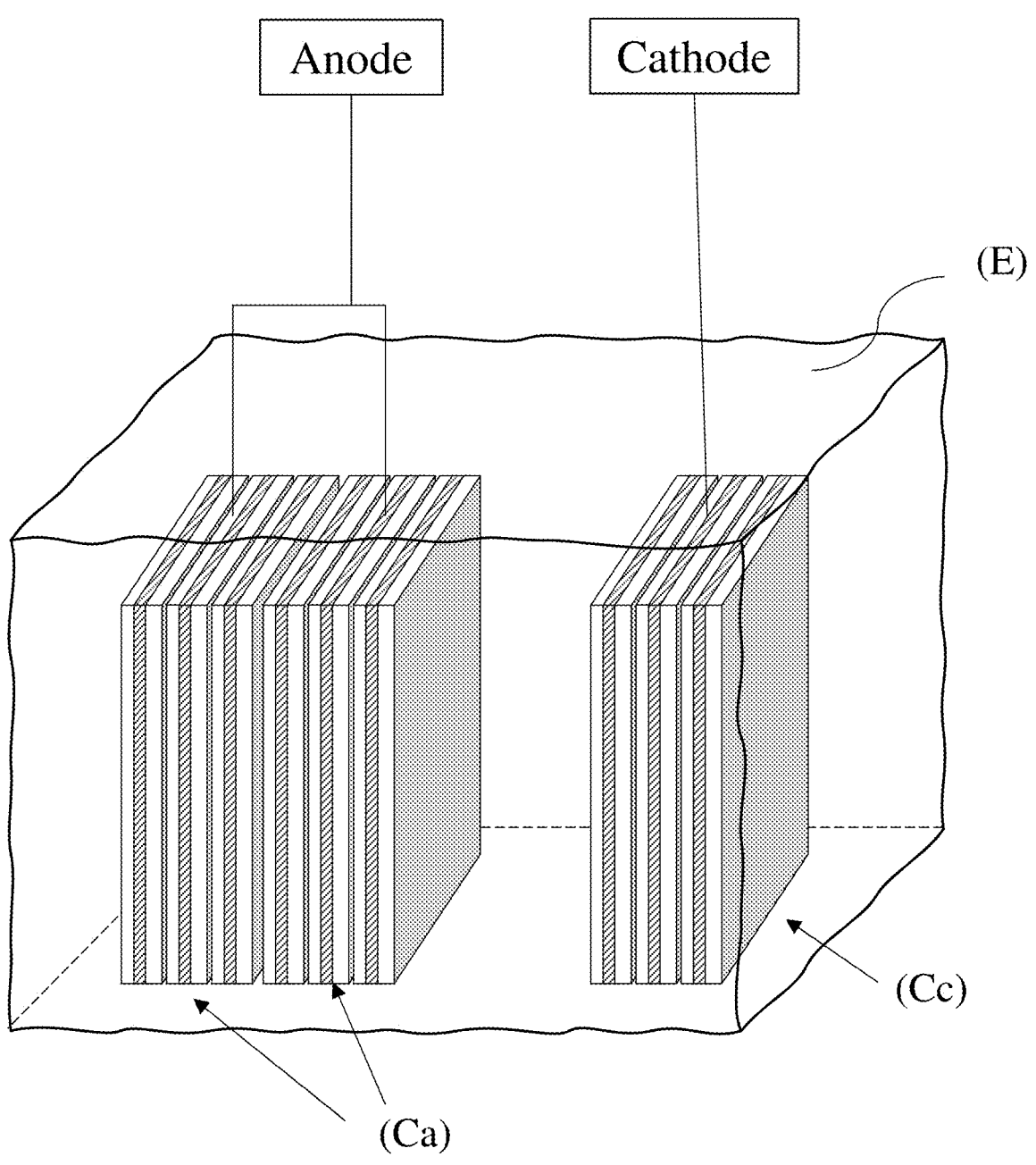
FIG. 6 is a schematic diagram of the side view of the battery provided by the invention.

Based on the aforementioned lead-carbon electrodes and/ or lead-carbon electrode sets, the present invention can be further used to implement a lead-carbon battery (Ba). As shown in FIG. 6, the lead-carbon battery (Ba) comprises an electrolyte (E), an anode set (Ac) immersed in the electrolyte and electrically connected to an anode comprising an electrode set (C) as previously described, and a cathode set (Cc) immersed in the electrolyte (E) and electrically connected to a cathode (Ca) which comprising an electrode set (C) as previously described. The electrolyte is not particularly limited, wherein some suitable electrolytes are sulfuric acid solutions.

Some comparison examples, embodiments and experimental examples listed below are used to illustrate the specific implementation of the present invention and the technical efficacy achieved, but not intended to limit the scope of the rights covered by the present invention.

Figure 7A:
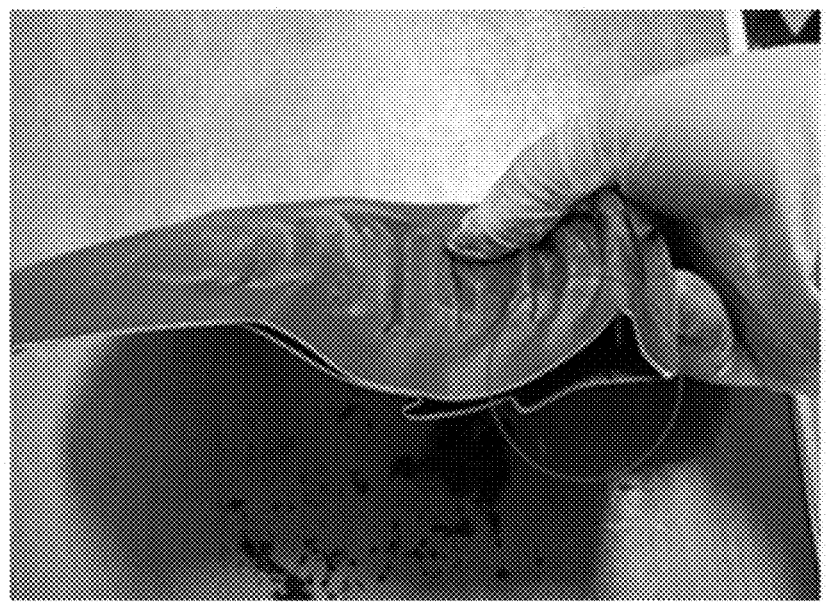
FIG. 7A to FIG. 7C are the external views of the lead-carbon electrodes according to comparison examples 1-3.

Comparison example 1. Initially, prepare 2 pieces of pure lead sheet with dimensions of 13 cm length, 9 cm width and 0.11 cm thickness, and prepare 10 pieces of carbon cloth with dimensions of 7 cm length, 7 cm width and 0.03 cm thickness, wherein the volume ratio of lead to carbon is 1:0.6. Next, coat graphite release agent on the surface of the upper and lower rollers, and place carbon cloth between the pure lead sheets to form the lead-carbon sandwich. Then, heat the rollers to 100° C., adjust the axis distance between the rollers to 0.1 cm, and set the rolling speed to 1.2 rpm. After that, place the lead-carbon sandwich between the rollers and squeeze the lead-carbon sandwich. As shown in FIG. 7A, the comparison example 1 cannot form the lead-carbon electrode, wherein the round box indicates that the lead-carbon combination could not be formed.

Figure 7B:

Comparison example 2. Initially, prepare 2 pieces of pure lead sheet with dimensions of 13 cm length, 9 cm width and 0.11 in thickness, and prepare 2 pieces of carbon cloth with dimensions of 7 cm length, 7 cm width and 0.03 cm thickness, wherein the volume ratio of lead to carbon is 1:0.6. Next, coat graphite release agent on the surface of the upper and lower rollers, and place carbon cloth between the pure lead sheets to form the lead-carbon sandwich. Then, heat the rollers to 180° C., adjust the axis distance between the rollers to 0.045 cm, and set the rolling speed to 1.2 rpm. After that, place the lead-carbon sandwich between the rollers and squeeze the lead-carbon sandwich. As shown in FIG. 7B, the comparison example 2 cannot form the lead-carbon electrode, wherein the round box indicates the exposed carbon material for showing the damaged surface of the lead material.

Figure 7C:
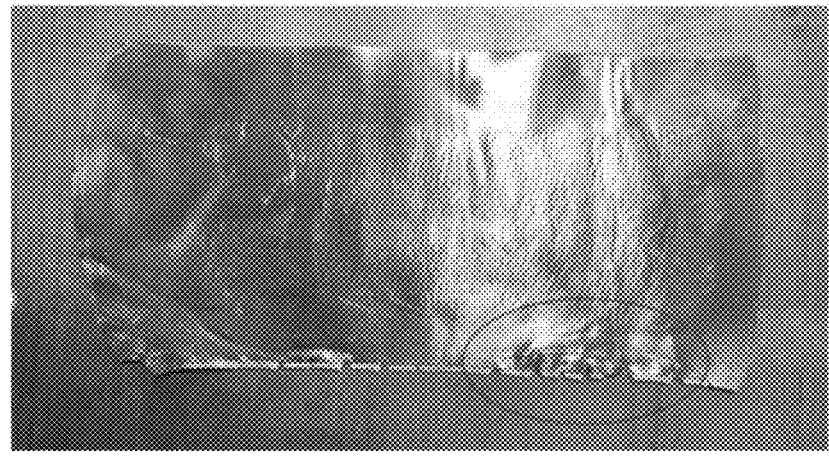

Comparison example 3. Initially, prepare 2 pieces of pure lead sheet with dimensions of 13 cm length, 9 cm width and 0.11 cm thickness, and prepare 2 pieces of carbon cloth with dimensions of 7 cm length, 7 cm width and 0.03 cm thickness. Next, coat graphite release agent on the surface of the upper and lower rollers, and place carbon cloth between the pure lead sheets to form the lead-carbon sandwich. Then, heat the rollers to 50° C., adjust the axis distance between the rollers to 0.045 cm, and set the rolling speed to 1.2 rpm. After that, place the lead-carbon sandwich between the rollers and squeeze the lead-carbon sandwich. As shown in FIG. 7C, the comparison example 3 cannot form the lead-carbon electrode, wherein the round box indicates some uneven cracks indicating the lead-carbon combination is non-uniform.

Embodiment 1. Initially, prepare two pieces of pure lead sheet with dimensions of 17 cm length, 11 cm width, and 0.11 cm thickness, and prepare two pieces of carbon cloth with dimensions of 11 cm length, 8 cm width, and 0.025 cm thickness. Next, apply graphite release agent to the surfaces of the upper and lower rollers and place the carbon cloth between the pure lead sheets to form a lead-carbon sandwich. Then, heat the rollers to 110° C., adjust the axis distance between the rollers to 0.06 cm, and set the rolling speed to 0.6 rpm. After that, place the lead-carbon sandwich between the rollers and squeeze the lead-carbon sandwich to form a lead-carbon electrode. Finally, remove the lead-carbon electrode from the rollers, cut the lead-carbon electrode to 6.6 cm long and 3.7 cm wide with a 2.0 cm long lug, and then use acetone to clean.

Embodiment 2. Initially, prepare 2 pieces of pure lead sheets with dimensions of 17 cm long, 11 cm wide and 0.11 cm thick, and prepare 2 pieces of carbon cloth with the dimensions of 11 cm long, 8 cm wide and 0.025 cm thick. Next, clean, polish, heat and dry the pure lead sheets before treatment. Then, apply graphite release agent on the surface of the upper and lower rollers, and place the carbon cloth between the pure lead sheets to form a lead-carbon sandwich, wherein the lead-carbon sandwich is arranged as lead-carbon-carbon-lead. And then, heat the rollers to 150° C., adjust the axis distance between the rollers to 0.11 cm, and set the rolling speed at 0.6 rpm. After that, place the lead-carbon sandwich between the rollers and squeeze it at a rolling speed of 0.6 rpm to obtain a lead-carbon electrode No. 1, remove the lead-carbon electrode No. 1 from the rollers and repeat the above steps to complete a lead-carbon pole No. 2. Moreover, place the lead-carbon electrode No. 1 on the lead-carbon electrode No. 2 to form an electrode sandwich. Again, maintain the roller temperature at 150° C. and the axis distance at 0.11 cm, also set the rolling speed at 0.6 rpm. And then place the electrode sandwich between the rollers and squeeze the electrode sandwich at a rolling speed of 0.6 rpm to obtain a No. 3 lead-carbon electrode with a thickness of 0.1 cm. Wherein, the structure of the No. 3 lead-carbon electrode is lead-carbon-carbon-lead-carbon-lead in order, which has high capacity and fast charging and discharging performance.

Figure 8A:
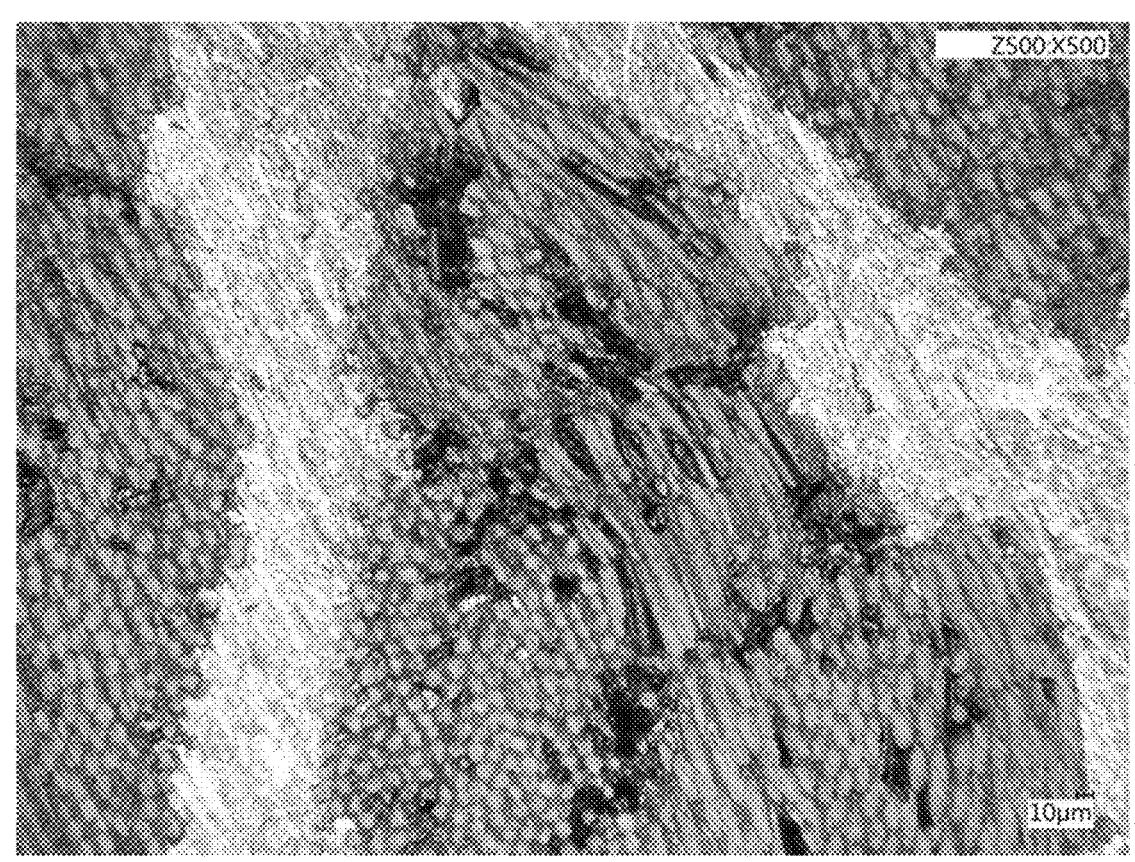
FIG. 8A is the sectional electronic micrograph of the lead-carbon electrode according to embodiment 3 which showing the joint surface of lead material and carbon material.

Embodiment 3. Initially, prepare 2 sheets of pure lead with dimensions of 17 cm length and 11 cm width, and prepare 5 sheets of carbon cloth with dimensions of 11 cm length and 8 cm width. Next, apply graphite release agent on the surface of the upper and lower rollers, and place the carbon cloth between the pure lead sheets to form a lead-carbon sandwich. Then, heat up the rollers to 110° C., adjust the axis distance between the rollers to 0.06 cm, and set the rolling speed to 0.6 rpm. And then, place the lead-carbon sandwich between the rollers and squeeze the lead-carbon sandwich to form a lead-carbon electrode. After that, remove the lead-carbon electrode from the rollers and cut the lead-carbon electrode into electrodes with dimensions of 6.6 cm length and 3.7 cm width and with 2.0 cm long lugs. Moreover, clean it with acetone. As shown in FIG. 8A, which is an enlarged view of the lead-carbon section of the lead-carbon electrode prepared in embodiment 3, it can be seen that lead and carbon are tightly combined and also the carbon fiber bundle is retained intact.

Embodiment 4. Use the lead-carbon electrode formed in the embodiment 1 to form a lead-carbon cell LCFNR4-2 having an anode and a cathode, and an electrolyte with 56.3 ml of sulfuric acid solution. The anode is connected to an anode sheet set by wire welding, immersed in the sulfuric acid solution and has four lead-carbon electrodes as described in embodiment 1. The cathode is connected to a cathode sheet set by wire welding, immersed in the sulfuric acid solution and has 5 lead-carbon electrodes as described in embodiment 1.

Embodiment 5. Use the lead-carbon electrode set formed in the embodiment 2 and the embodiment 3 to form a lead-carbon battery LCFN25-2 which comprises an anode, a cathode, and an electrolyte with 40.4 ml of sulfuric acid solution. This anode is connected to an anode sheet set by wire welding, immersed in the sulfuric acid solution and has six lead-carbon electrodes as made in the embodiment 2. The cathode is connected to a cathode set by wire welding, immersed in the sulfuric acid solution and has 7 lead-carbon electrodes as made in the embodiment 3.

Figure 8B:
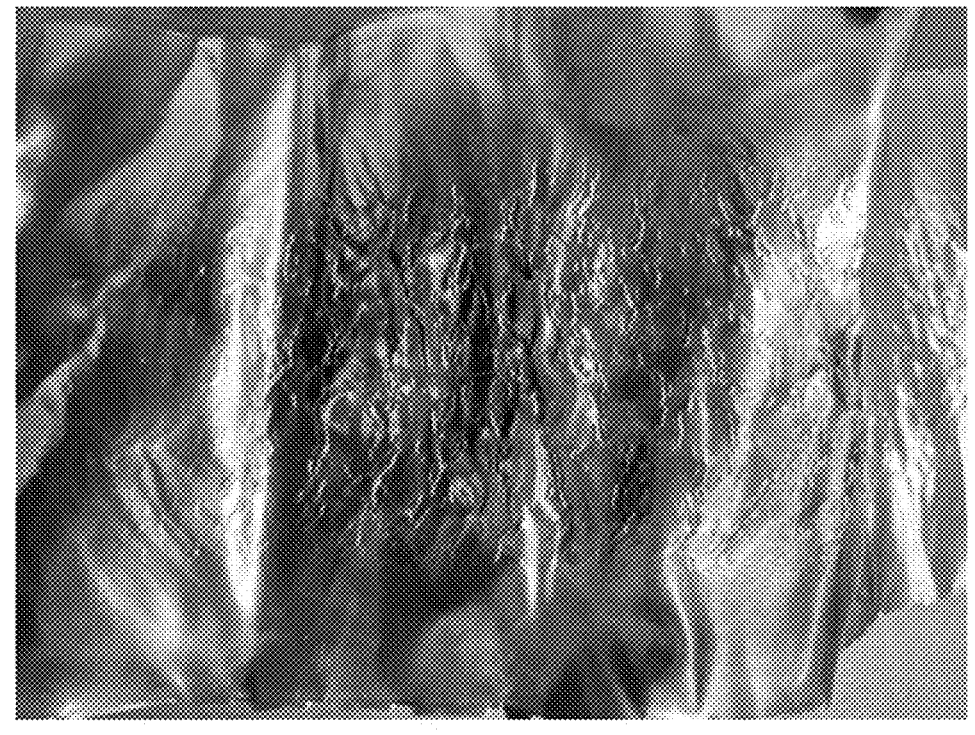
FIG. 8B is the external view of the lead-carbon electrode according to embodiment 6.

Embodiment 6. Initially, prepare 2 pieces of pure lead sheet with dimensions of 13 cm length, 9 cm width and 0.11 cm thickness, and prepare 4 pieces of carbon cloth with dimensions of 7 cm length, 7 cm width and 0.03 cm thickness. Next, Coat graphite release agent on the surface of the upper and lower rollers, and place the carbon cloth between the pure lead sheets to form a lead-carbon sandwich. Then, heat the rollers to 100° C., adjust the axis distance between the rollers to 0.01 cm, and set the rolling speed to 1.2 rpm. And then, place the lead-carbon sandwich between the rollers and squeeze the lead-carbon sandwich to form a lead-carbon electrode. After that, remove the lead-carbon electrode from the rollers. As shown in FIG. 8, the embodiment 6 can form the lead-carbon electrode. But, as indicated by the round box, the surface of the lead material has wrinkles and unevenness, which indicates that the lead carbon combination is synthetic but the molding effect is poor while being compared with the embodiment 1 or the embodiment 2.

Figure 9A:
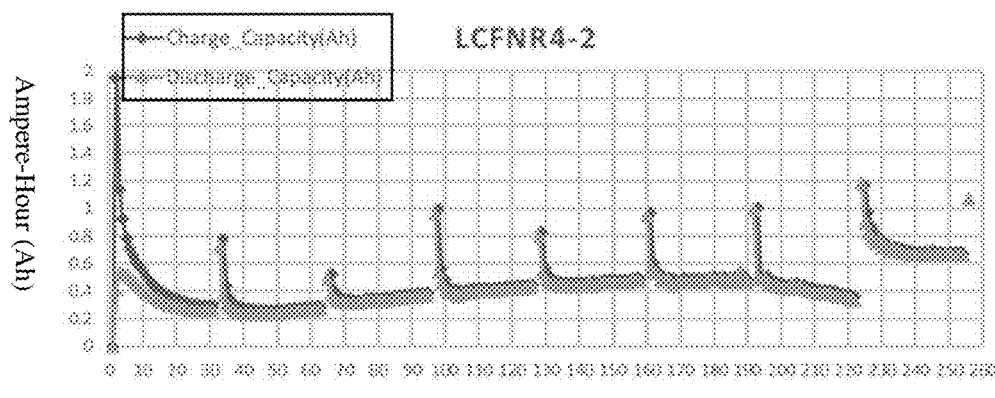
FIG. 9A to FIG. 9C are the charging/discharging test record chart according to experimental embodiment 1.
Figure 9B:
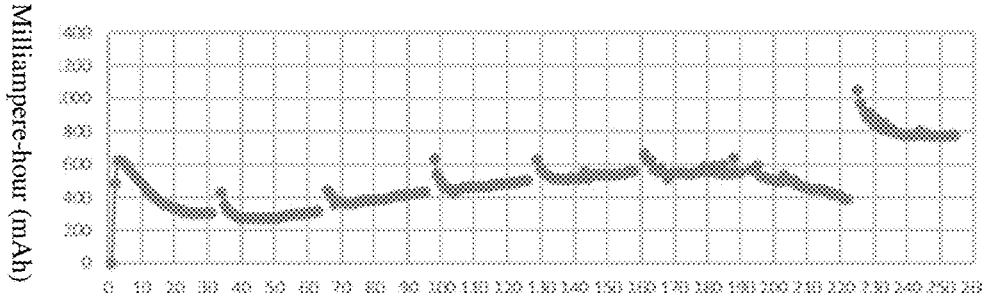
Figure 9C:
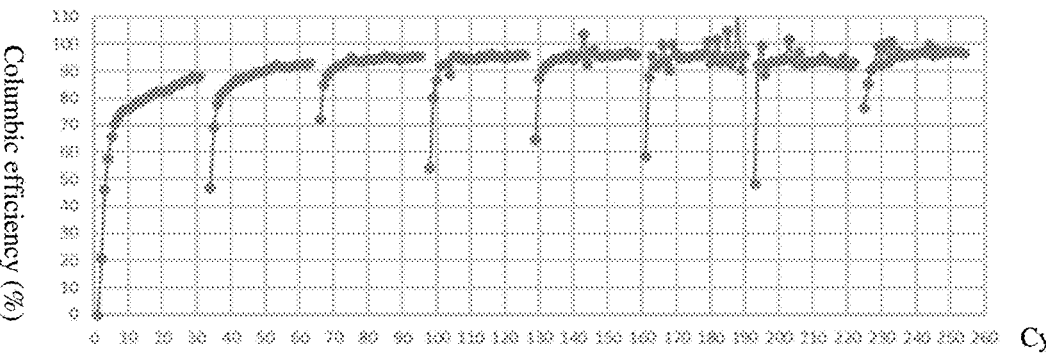

Experimental example 1. The LCFNR4-2 lead-carbon battery of the embodiment 4 was tested for saturation and unsaturation cycles by charging and discharging at constant current. As shown in FIG. 9A, the battery was charged at a constant current of 1.2 amps (A) and a constant voltage of 2.4 volts (V) for 2 hours, and then discharged at a constant current of 3.6 amps and a cutoff voltage of 1.5 volts. Totally, 260 cycles of charging and discharging was done. As shown in FIG. 9A and FIG. 9B, with the increase in the number of charging and discharging cycles, the Columbic efficiency (charging capacity/discharging capacity, %) of the LCFNR4-2 is almost maintained at a level of 100%, but the capacity grows from 0.3 ampere hour (Ah) in 1 to 30 cycles to 0.6 ampere hour in 230 to 260 cycles with the increase in the number of cycles. As shown in FIG. 9C, the record of the depth of discharge (DoD) of the aforementioned cycles has a trend that the depth of discharge stably remains around 100% with the increase in the number of cycles.

Figure 10A:
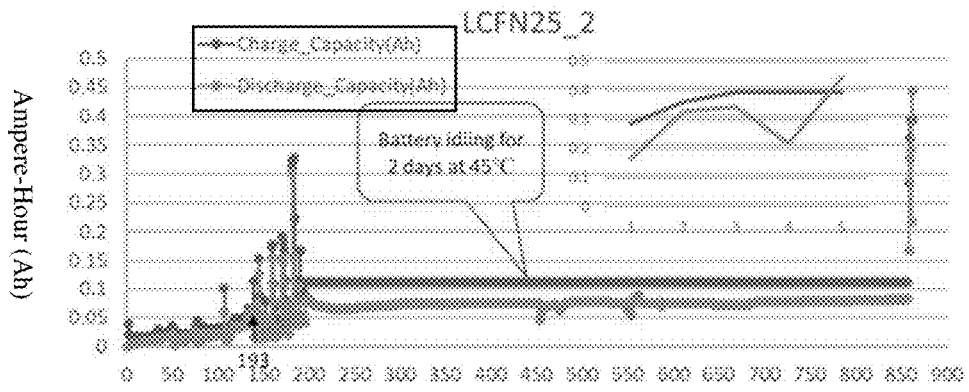
FIG. 10A to FIG. 10C are the charging/discharging test record chart according to experimental embodiment 2.
Figure 10B:
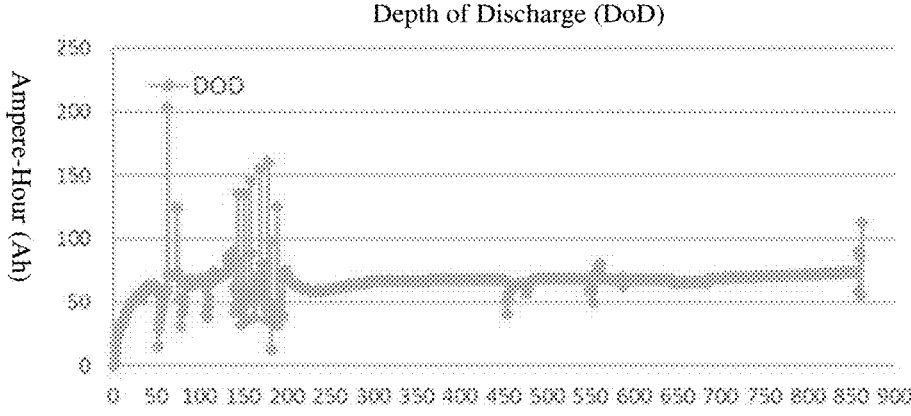
Figure 10C:
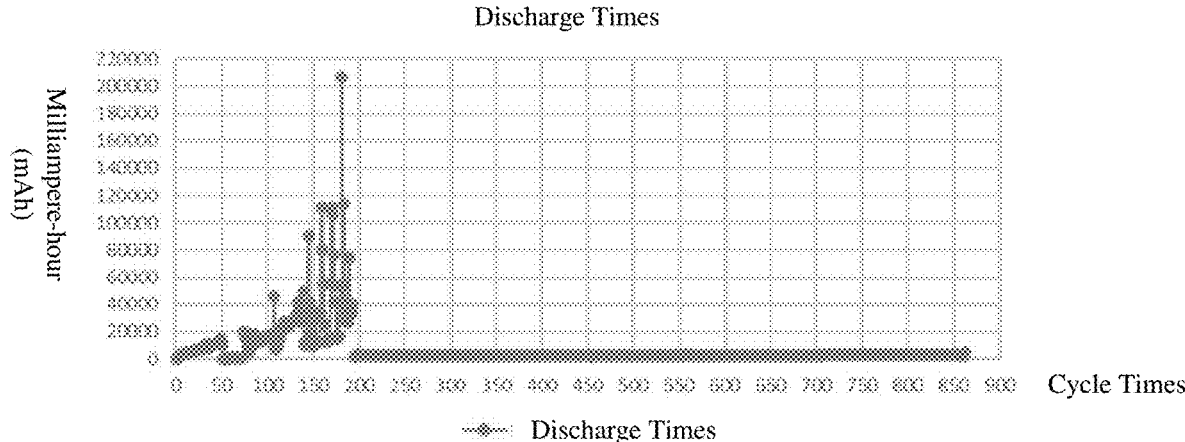

Experimental example 2. The lead-carbon battery LCFN25_2 of the embodiment 5 was subjected to a rapid charge/discharge and battery life test. As shown in FIG. 10A to FIG. 10C, a total of 850 cycles were performed. As shown in below Table 3 which illustrates the conditions of the cyclic charge/discharge test in the experimental example 2, there are two stages of charging and discharging with different voltages and currents respectively.

As shown in FIG. 10A to FIG. 10C, after 193 cycles of charging and discharging at different voltages, a total of 656 cycles of charging and discharging at constant currents was done. The results have stable level in terms of Columbic efficiency and discharge depth. Accordingly, it can withstand cyclic charging and discharging under changing voltage conditions, also can maintain stable coulomb efficiency and discharge depth in subsequent charging and discharging.

TABLE 3

|  | charging | | | discharging | | |
|  | | | | Cut-off | | |
|  | Voltage (V) | Current (A) | Time | Current (A) | voltage (V) | Number of cycling |
| Stage 1 | 2.8 | — | 30 seconds | 0.005 | 0.5 | 1 to193 |
|  | 2.4 | — | 2 hours | | | |
| Stage 2 | — | 0.15 | 1 hours | 0.1 | 1.5 | 194 to 850 |

The method provided by the invention is environmentally friendly. It does not require further heat treatment after compression, and the temperature can be optionally set from room temperature to 270° C. during the compression for forming the lead-carbon electrode. In addition, no pressurized working environment is required, and then energy is saved and safety of operator is ensured. Also, pre-treatment of lead or carbon materials can be simplified or even omitted, and then contamination caused by organic solvents is reduced. Moreover, the lead material and the carbon material are combined by only using compression, which is more advantageous than using penetration, coating or others to combine the lead material with the carbon material. Further, the invention can optionally heat the compressing unit and/or the lead material to enhance the combining effect between the lead material and the carbon material. The lead-carbon electrode provided by the present invention can be used as a super capacitor, which can be adapted to fast charging and discharging conditions from 1 to 5 C. Also, it can withstand multiple cycles of charging and discharging under the charging and discharging conditions of voltage changes. In addition, it has stable Columbic efficiency and discharging depth in the subsequent charging and discharging at constant current, and has strong battery resistance and long life expectancy.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for lead carbon compression moulding, comprising:
   a first stacking step: placing a first carbon material between a first lead material and a second lead material so as to form a first lead-carbon sandwich, wherein the first carbon material is a carbon fiber fabric, which is made of materials selected from the group consisting of activated carbon, bamboo carbon, charcoal or any combination thereof; and
   a first compressing step: compressing the first lead-carbon sandwich between a first compressing unit and a second compressing unit such that the first lead material and the second lead material are combined with the first carbon material so as to form a first lead-carbon electrode, wherein, before the first compressing step, the method further comprises heating the first compressing unit and the second compressing unit to a first temperature between 60 to 270° C., excluding 100° C. and 180° C.;
   wherein, the first lead-carbon sandwich has a first thickness d1 and the first lead-carbon electrode has a second thickness d2, and the ratio of d1 to d2 is less than 10:1.

2. The method for lead carbon compression moulding according to claim 1, wherein the first compressing unit and the second compressing unit forms a working distance therebetween, wherein the ratio of the first thickness d1 to the working distance is between 1:1 to 35:1.

3. The method for lead carbon compression moulding according to claim 1, further comprising a first heating step which heats the first lead material, the second lead material and the first carbon material to a first temperature before the first stacking step, wherein the first temperature is between room temperature and lead melting point.

4. The method for lead carbon compression moulding according to claim 1, wherein the first compressing unit is a first roller and the second compressing unit is a second roller, and wherein the first roller and the second roller roll relative to each other along their respective axes at a rolling rate so as to compress the first thickness d1 into the second thickness d2, wherein the ratio of d1 to d2 is between 3:1 to 6.5:1.

5. The method for lead carbon compression moulding according to claim 1, wherein one surface of the first lead material is in contact with the first carbon material to form a first joint surface and another surface is a first compressed surface directly contacted with the first compressing unit, wherein one surface of the second lead material is in contact with the first carbon material opposite to the first lead material to form a second joint surface and another surface is a second compressed surface directly contacted with the second compressing unit, and wherein the distance between the first compressed surface of the first lead-carbon sandwich and the second compressed surface is the first thickness d1 and the distance between the first compressed surface of the first lead-carbon electrode and the second compressed surface is the second thickness d2.

6. The method for lead carbon compression moulding according to claim 5, wherein the first compressing unit and the second compressing unit forms a working distance therebetween, wherein the ratio of the first thickness d1 to the working distance is between 1:1 to 35:1.

7. The method for lead carbon compression moulding according to claim 5, further comprising a first heating step which heats the first lead material, the second lead material and the first carbon material to a first temperature before the first stacking step, wherein the first temperature is between room temperature and lead melting point.

8. The method for lead carbon compression moulding according to claim 5, wherein the first compressing unit is a first roller and the second compressing unit is a second roller, and wherein the first roller and the second roller roll relative to each other along their respective axes at a rolling rate so as to compress the first thickness d1 into the second thickness d2, wherein the ratio of d1 to d2 is between 3:1 to 6.5:1.

9. The method for lead carbon compression moulding according to claim 5, wherein the lead to carbon ratio of the first joint surface is between 1:0.01 to 1:1, and wherein the lead to carbon ratio of the second joint surface is between 1:0.01 to 1:1.

\* \* \* \* \*